United States Patent
LaFauci et al.

(10) Patent No.: US 7,392,739 B2
(45) Date of Patent: Jul. 1, 2008

(54) COOKING BASKET HOLDER

(76) Inventors: Keith M LaFauci, 326 Louisiana Ave., Sulphur, LA (US) 70663; Lori Beth LaFauci, 326 Louisiana Ave., Sulphur, LA (US) 70663

( * ) Notice: Subject to any disclaimer, the term of this patent is extended or adjusted under 35 U.S.C. 154(b) by 134 days.

(21) Appl. No.: 11/463,766

(22) Filed: Aug. 10, 2006

(65) Prior Publication Data

US 2007/0000394 A1    Jan. 4, 2007

Related U.S. Application Data

(63) Continuation-in-part of application No. 11/171,990, filed on Jul. 1, 2005, now abandoned.

(51) Int. Cl.
*A47J 37/12* (2006.01)
*A47J 45/10* (2006.01)

(52) U.S. Cl. ............... 99/403; 99/413; 294/158

(58) Field of Classification Search ........ None
See application file for complete search history.

(56) References Cited

U.S. PATENT DOCUMENTS 5,509,708 A * 4/1996 Nathan ............... 294/141
5,918,535 A * 7/1999 Moreau ............... 99/413
6,598,915 B2 * 7/2003 Ngo et al. ............ 294/27.1
7,255,379 B1 * 8/2007 Adams, Jr. ........... 294/27.1
2007/0251517 A1 * 11/2007 Sus et al. ............ 126/20

* cited by examiner

*Primary Examiner*—Joseph M Pelham
(74) *Attorney, Agent, or Firm*—Patwrite LLC; Mark David Torche

(57) ABSTRACT

A cooking basket holder comprises a hand gripping section that allows a user to hold the cooking basket holder by inserting four fingers and grasping thus providing a firm grip. An elongated hook section is cylindrical and is tapered having a smaller diameter at the insertion end and gradually increasing in diameter longitudinally. A locking notch is formed at the distal end therein and has a smaller diameter than the insertion end.

Additionally, in another embodiment of the present invention, semi-circular arms are provided to add extra stability.

In another embodiment of the present invention, the insertion end is surrounded by flexible spring leaves to lock the cooking basket holder in place.

In yet another embodiment of the present invention, a mechanical catch arm is provided to lock the cooking basket holder.

20 Claims, 5 Drawing Sheets

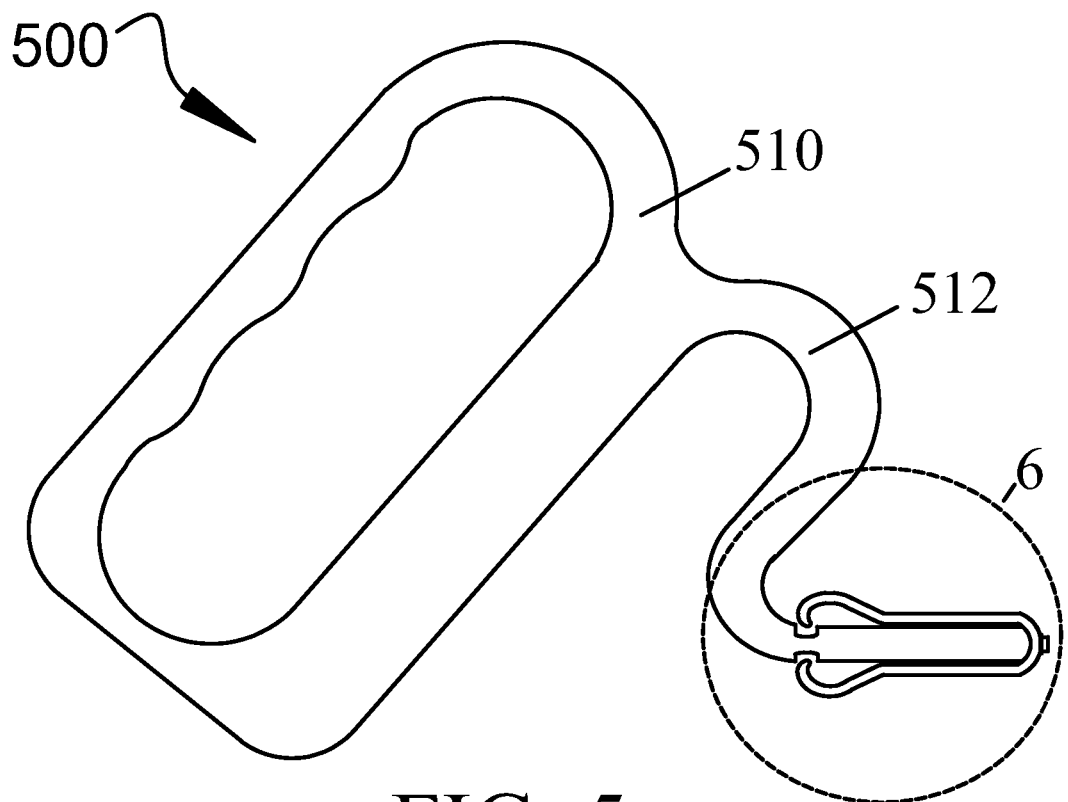
FIG. 5
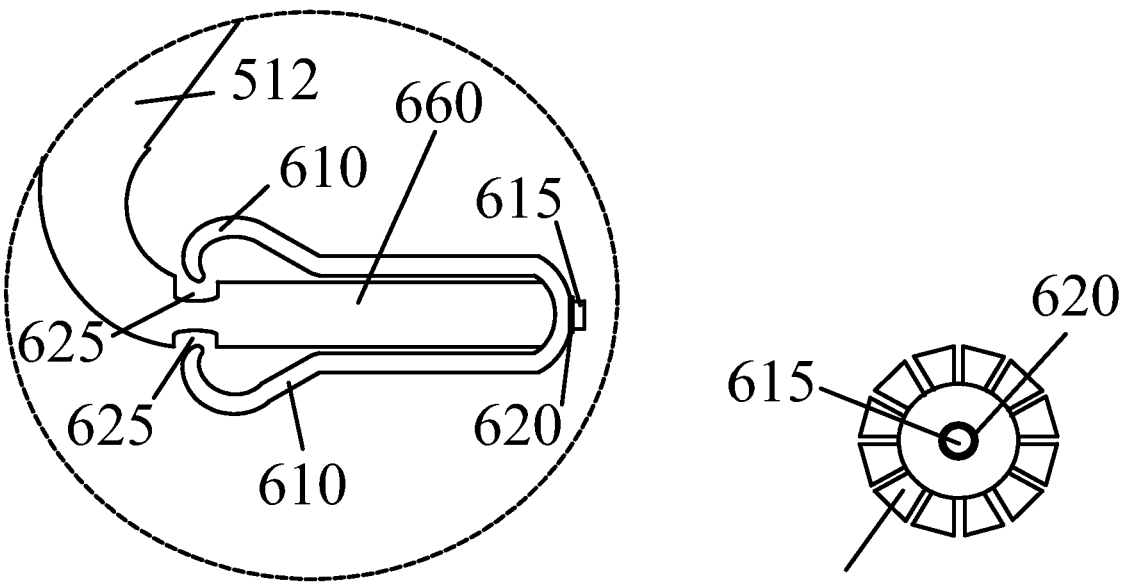
FIG. 6
FIG. 7

COOKING BASKET HOLDER

RELATED APPLICATIONS

This application is a continuation-in-part of U.S. patent application Ser. No. 11/171,990 filed Jul. 1, 2003 now abandoned, which is herein incorporated by reference.

BACKGROUND OF THE INVENTION

While society as a whole can be characterized as collection of individuals having a variety of differing races, creeds, ethnicities, religions and political beliefs, arguably no other act is more commonly accepted by all of humanity than the enjoyment of a good meal. As a result, it is important to cook food in a safe and efficient manner. To meet this need, a variety of cooking methods have emerged. Cooking by placing food in a perforated basket and lowering the basket into a larger, non-perforated pot containing heated water, oil, or cooking grease has become a commonplace practice in both home and commercial cooking. The basket/pot combination is used to cook food by heating a large pot containing a cooking liquid, placing a volume of food in a basket with holes, and lowering the basket into the pot. Once the food has been exposed to the heating liquid for a sufficient amount of time, the basket is lifted upward to a position out of contact with the cooking liquid. The basket is then suspended above the pot to allow any excess cooking liquid to drain. The basket is finally removed from the pot and tipped to remove the food from the basket.

Although this basket/pot combination is an effective way to cook food, users have encountered problems in the draining and removing the basket from the pot. Draining the basket requires a user to lift and hold the hot basket above the pot. Users often encounter difficulty suspending the basket above the pot. Furthermore, due to the heat and steam, the user is susceptible to burn injuries when handling the basket. In addition, once the basket is drained the user must remove the basket from the pot and pour the cooked food out of the basket.

The basket and pot combination has become a mainstay in home and commercial cooking, and is becoming a favorite cooking method as more individuals are exposed to its ability to cook a variety of different foods quickly and efficiently. As a result, consumers are in need of a tool that assists them in safely lifting the basket, draining the basket, and tipping the basket to remove the cooked food.

SUMMARY OF THE INVENTION

A cooking basket holder comprises a gripping section that allows a user to hold the cooking basket holder by inserting four fingers thus providing a firm grip. An elongated hook section is cylindrical and tapered having a smaller diameter at an insertion end and gradually increasing in diameter longitudinally. A locking notch is formed at the distal end therein and has a smaller diameter than the insertion end.

Additionally, in another embodiment of the present invention, semi-circular arms are provided to add extra stability.

In another embodiment of the present invention, the insertion end is surrounded by flexible spring leaves to lock the cooking basket holder in place.

In yet another embodiment of the present invention, a mechanical catch arm is provided to lock the cooking basket holder.

Other features and advantages of the instant invention will become apparent from the following description of the invention which refers to the accompanying drawings.

BRIEF DESCRIPTION OF THE DRAWINGS

FIG. 5 is a sectional view of yet another embodiment of the present invention.

FIG. 6 is a detailed view of a section of shown in FIG. 5.

FIG. 7 is a forward view of a portion detailed in FIG. 6.

DETAILED DESCRIPTION OF THE INVENTION

Figure 1:
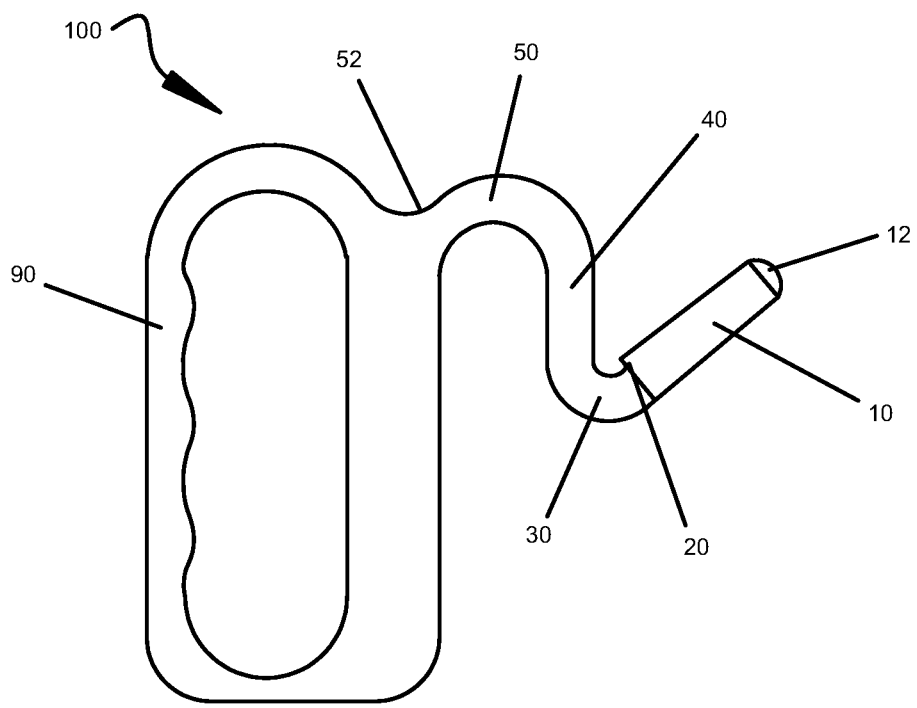
FIG. 1 is a side view of an embodiment of the present invention.

Reference is now made to the drawings in which reference numerals refer to like elements.

Referring to FIGS. 1-4, a cooking basket holder 100 is shown having a gripping portion 90 that allows a user to grip holder 100 securely. Gripping portion 90 allows the user to insert all the fingers (4 fingers, but not the thumb) through gripping portion 90 to provide excellent control. Holder 100 has a connecting portion 50 connected to gripping portion 90 with a curved section 52. A straight section 40 leads to an elongated cylindrical hook member 30 which is angled about 40 degrees from the horizontal and includes a tapered insertion portion 10. Insertion portion 10 is tapered to fit within holes in a cooking basket 200 and has a small diameter of about ⅜ inch and increasing in diameter to about ⅞ inch distally located from an insertion portion end 12. A locking notch 20 is provided by reducing the diameter from ⅞ inch at the distal end of insertion portion 10 to ⅜ inch. Of course, other diameters would work as long as locking notch 20 has a smaller diameter than the adjacent insertion portion 10 diameter.

In use, a user grips holder 100 using a first hand 305 and inserting holder 100 into a hole in cooking basket 200 and thus gravitationally locking holder 100 in place as basket 200 rests in locking notch 20. Warming is accomplished by inserting holder 100 in an upper hole of cooking basket 200 and resting holder 100 on top of a cooking pot 205 along an inner surface of connecting portion 50. This allows control over the heating of the food (not shown) in cooking basket 200 by adjusting the amount of contact the food has with a cooking liquid 210 by simply selecting an appropriate hole in cooking basket 200.

Cooking basket 200 is emptied by inserting holder 100 in a lower hole and securing in place by locking between locking notch 20 and placing a second hand 310 towards the front of cooking basket 200 and applying a slight downward pressure. This securely locks cooking basket 200 in place and allows the user to maintain complete control during the pouring process.

Draining is achieved by inserting holder 100 in a lower hole of cooking basket 200 and resting holder 100 on top of cooking pot 205 along an inner surface of connecting portion 50. Proper selection of an appropriate hole allows cooking basket 200 to be suspended without making contact with cooking liquid 210.

Figure 2:
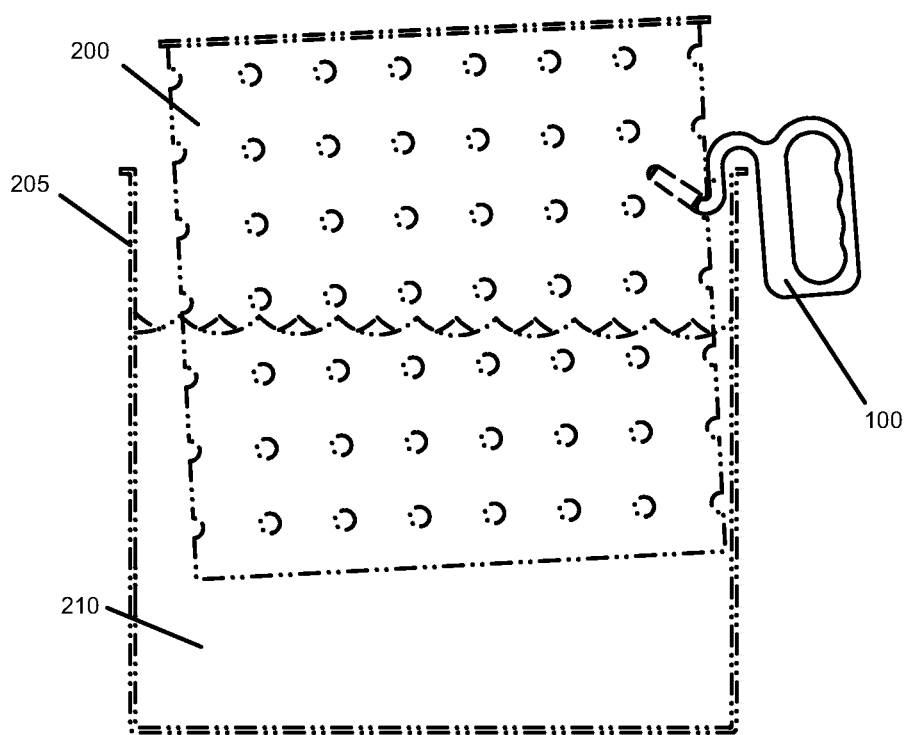
FIG. 2 is a sectional view of an embodiment of the present invention.
Figure 3:
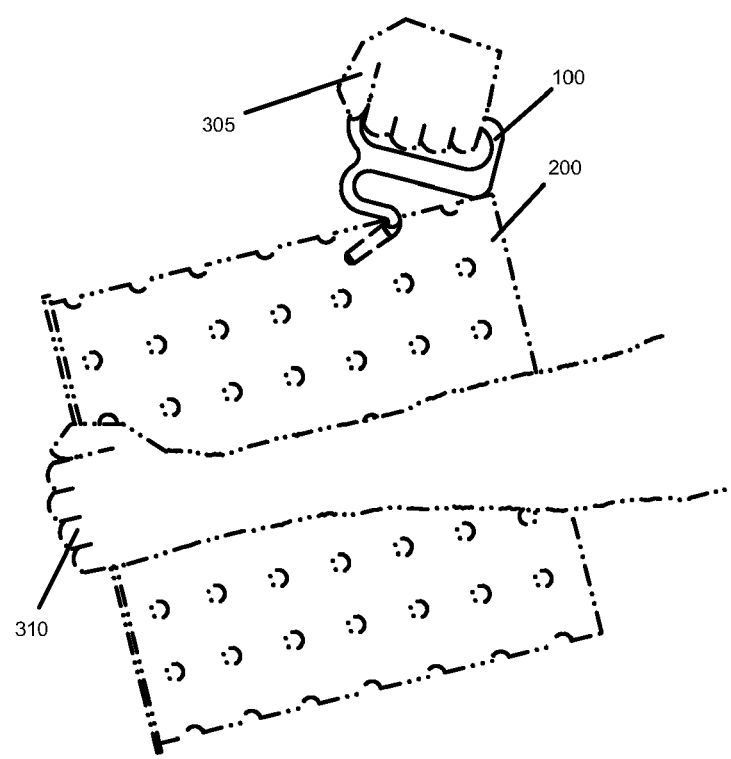
FIG. 3 is a side view of an embodiment of the present invention in use.
Figure 4:
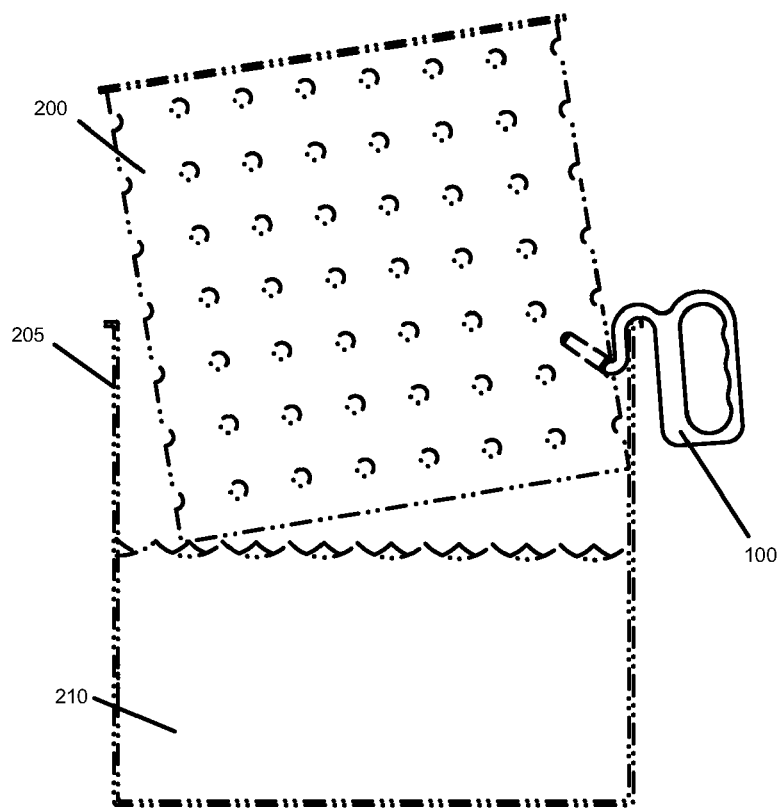
FIG. 4 is a sectional view of an embodiment of the present invention in use.
Figure 9:
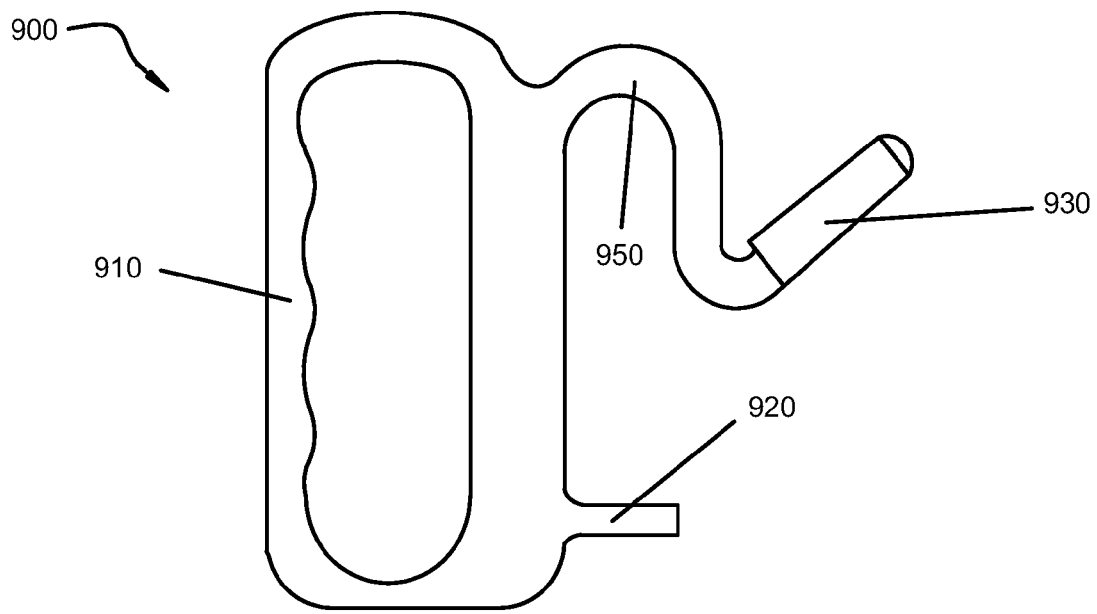
FIG. 9 is a side view of another embodiment of the present invention.
Figure 10:
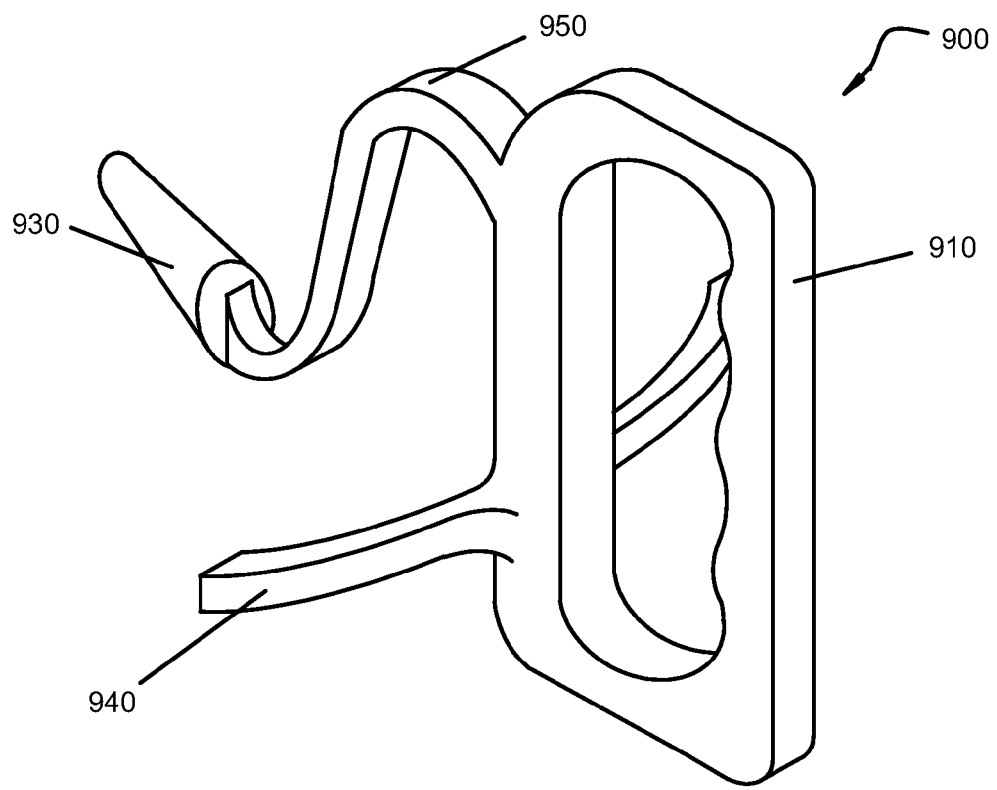
FIG. 10 is a perspective view of the embodiment shown in FIG. 9.

Now referring to FIGS. 9 and 10, another embodiment of the present invention is shown having a stabilizing arm 940 which engages a portion of the circumference of cooking basket 200 (as shown in FIG. 2) to provide additional stability as a cooking basket holder 900 is used. A gripping portion 910 is attached to a hook member 930 by a connection portion 950. Stabilizing arm 940 may be short or long depending on the degree of extra stability desired. The stabilizing arm may be made of a flexible material to allow use with varying size cooking baskets or could be available in various sizes to match particular diameter cooking baskets.

Reference is now made to FIGS. 5 through 7 which depict a spring loaded embodiment of the present invention. A cooking basket holder 500 comprises a gripping section 510 joined to a hook member 660 by a connecting portion 512. Hook member 660 has a plurality of spring leaves 610 that flex when forced through a hole in cooking basket (as shown in FIG. 2) effectively temporarily reducing the diameter of hook member 660 until passing completely through the hole which locks holder 500 in place. An annular depression 625 is disposed along a circumference of hook member 660 surrounded by free ends of spring leaves 610 which allow spring leaves to compress as forced through a cooking basket hole. A rivet 615 and a washer 620 are used to secure the plurality of spring leaves to hook member 660. Of course other methods may be used to secure spring leaves 610 to hook member 660 as is known in the art.

Figure 8:
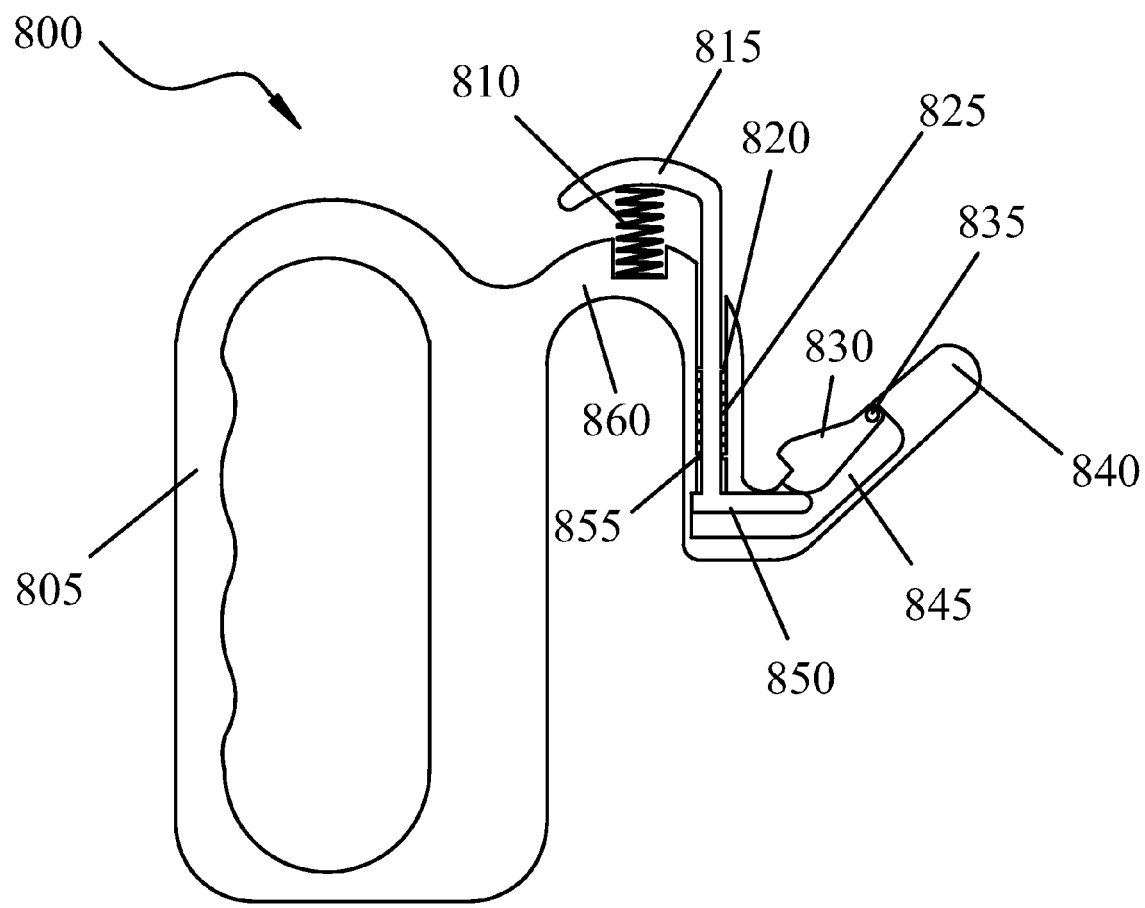
FIG. 8 is a sectional view of still another embodiment of the present invention.

FIG. 8 shows another embodiment of a cooking basket holder 800 that utilizes a mechanical locking mechanism. A gripping portion 805 is attached to a hook member 840 by a connecting portion 860. Disposed on connecting portion 860 is a release lever 815 outwardly biased by a release biasing spring 810. A release lever 815 directs a force to a release lever arm 850 and is additionally biased by a lever spring 825 constrained between an upper spring holder 820 and a lower spring holder 855. Upper spring holder 820 is attached to release lever 815 and lower spring holder 855 is attached to connecting portion 860 thus biasing release lever in a normally locked position. Hook member 840 has a catch arm opening 845 disposed beneath a catch arm 830 which rests against release lever arm 850 to bias catch arm 830 in a locked position. In use, as hook member 840 is inserted in a cooking basket hole (such as shown in FIG. 2) catch arm 830 is forced downward into a non-locked orientation until passing through the hole when the biasing from springs 810 and 820 force catch arm 830 to return to a locked position, thus securing cooking basket holder 800 to cooking basket. When removing holder 800, a user presses release lever 815 with a thumb which moves release lever arm 850 out of the way which allows catch arm 830 to drop out of the locked position to an unlocked orientation and can therefore be removed. An additional biasing spring (not shown) may be added to bias catch arm 830 so that when release lever arm 855 is moved, catch arm 830 is forced into an unlocked position.

Although the instant invention has been described in relation to particular embodiments thereof, many other variations and modifications and other uses will become apparent to those skilled in the art.

What is claimed is:

1. A cooking basket holder comprising:
   an elongated cylindrical hook member having an insertion end;
   said insertion end having a shoulder portion and a tip;
   said insertion end, between the tip and shoulder portion being geometrically conical in shape wherein the diameter of said tip is less than said shoulder portion;
   a gripping portion having a finger grip opening having an upper portion disposed at a top of said gripping portion therein;
   a connecting portion disposed between said upper portion and said insertion end of said hook member and;
   said insertion end having a locking notch along an upper portion therein and distally disposed from said tip.

2. The cooking basket holder of claim 1 wherein said cooking basket holder is made from heat resistant plastic.

3. The cooking basket holder of claim 1 wherein said cooking basket holder is made from metal.

4. The cooking basket holder of claim 1 further comprising:
   a semi-circular stabilizing arm perpendicularly disposed on a hook member side of a lower portion of said gripping portion.

5. The cooking basket holder of claim 1 wherein said hook member is offset from the horizontal at an angle in a range of between 30 degrees to 50 degrees.

6. The cooking basket holder of claim 1 wherein said hook member is offset from the horizontal at an angle of about 40 degrees.

7. The cooking basket holder of claim 1 wherein said connecting member has an upper section with a radius of curvature that is less than an upper section of said gripping portion.

8. A cooking basket holder comprising:
   an elongated cylindrical hook member having an insertion end;
   said hook member having an increasing diameter from said insertion end to an opposite end therein;
   a gripping portion having a finger grip therein;
   a connecting portion disposed between an upper portion of said gripping portion and said opposite end of said hook member and;
   said hook-member having an asymmetric locking notch along an upper portion therein and distally disposed from said insertion-end wherein said insertion end diameter tapers from about ⅜ inch to about 7/16 inch at a distal end.

9. The cooking basket holder of claim 8 wherein said locking notch is formed by having a smaller diameter adjacent to said distal end diameter.

10. The cooking basket holder of claim 9 wherein said smaller diameter is about ⅜ inch.

11. A cooking basket holder comprising:
    an elongated cylindrical hook member having an insertion end;
    said insertion end having an insertion catch cap substantially surrounding said insertion end;
    a gripping portion having a finger grip opening therein; and
    a connecting portion disposed between an upper portion of said gripping portion and said insertion end.

12. The cooking basket holder of claim 11 wherein said insertion catch cap further comprises a plurality of spring leaves wherein when said hook member is inserted in said cooking basket, said spring leaves compress to fit within a cooking basket hole and then decompress after insertion.

13. The cooking basket holder of claim 12 wherein said plurality of spring leaves are made from spring steel.

14. The cooking basket holder of claim 12 wherein said hook member has an annular depression groove disposed around the periphery of a distal end of said insertion end wherein said plurality of spring leaves fit within said depression groove when compressed.

15. The cooking basket holder of claim 14 wherein said catch cap has at least two different diameters wherein at least one of said different diameters is distally located therein and is larger than an insertion end diameter.

16. A cooking basket holder comprising:
  an elongated cylindrical hook member having an insertion end;
  said hook member having a moveable catch arm disposed longitudinally therein;
  a biasing means for biasing said catch arm in a normally engaged position;
  a release means for releasing said catch arm;
  a gripping portion having a finger grip opening therein; and
  a connecting portion disposed between an upper portion of said gripping portion and said insertion end.

17. The cooking basket holder of claim 16 wherein said biasing means is a spring.

18. The cooking basket holder of claim 16 wherein said release means comprises a spring biased lever arm adjacently disposed against said catch arm wherein when said release means is activated, said lever arm moves to allow said catch arm to rotate into a disengaged position.

19. The cooking basket holder of claim 18 wherein said release means in disposed within said connecting portion.

20. The cooking basket holder of claim 19 wherein said catch arm is tapered having a smaller diameter at an end to a larger diameter at a distal end therein.

* * * * *